Figure 7:
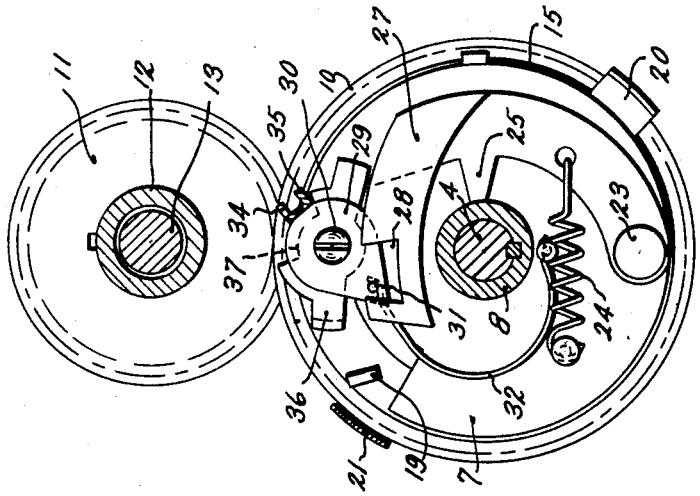

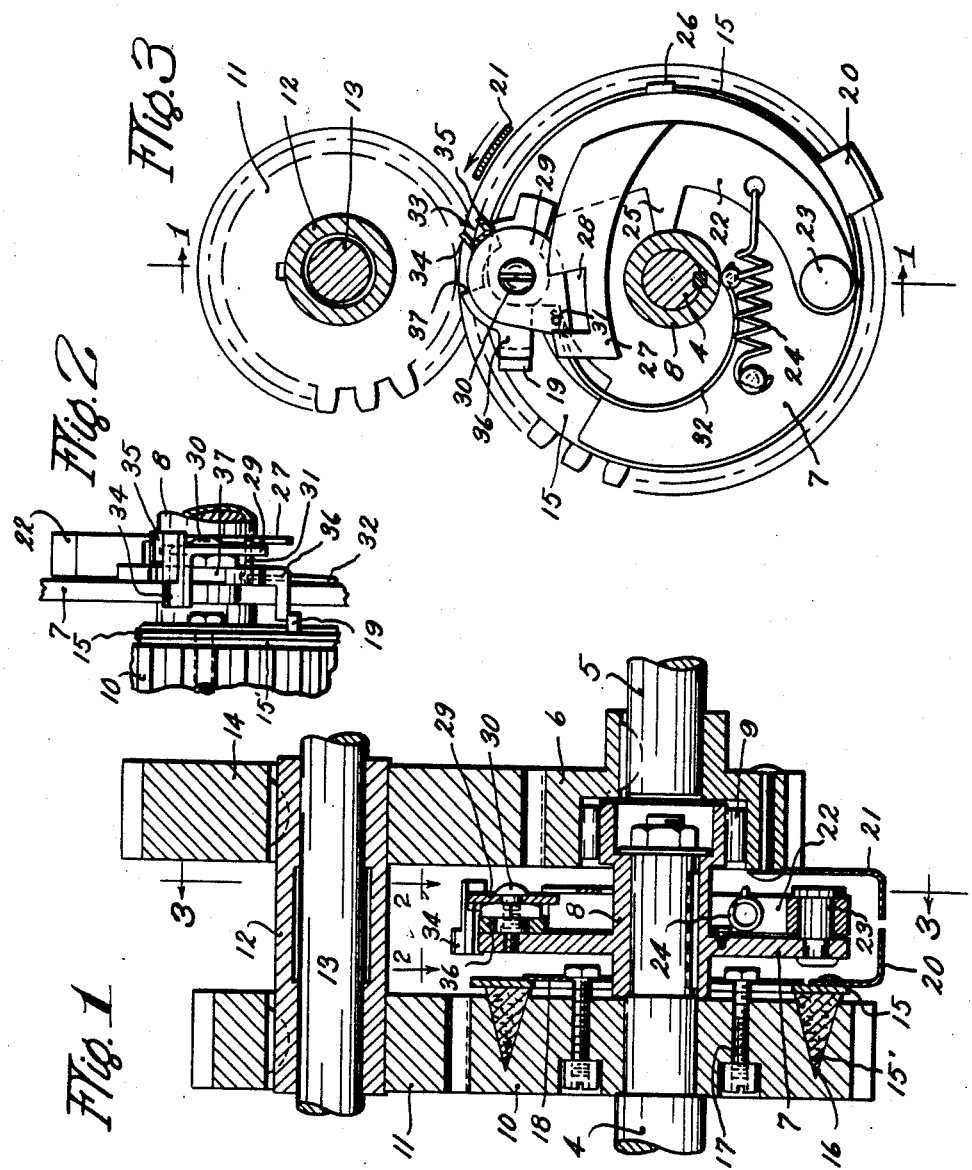

Oct. 29, 1940.  P. E. HOCHSTETTER  2,219,812
TRANSMISSION DRIVE
Original Filed April 8, 1938     4 Sheets-Sheet 2
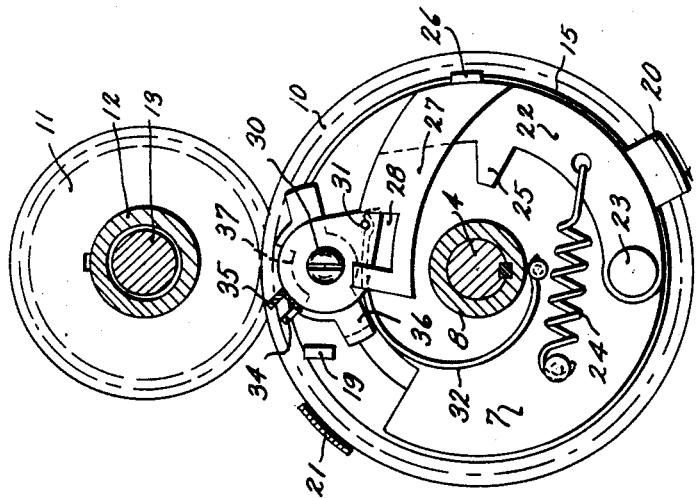
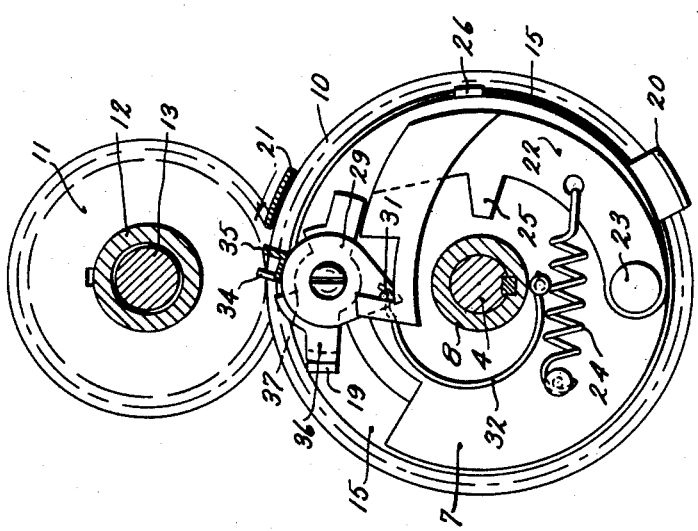
INVENTOR
*Paul E. Hochstetter*
BY *Chapin + Neal*
ATTORNEYS Oct. 29, 1940.  P. E. HOCHSTETTER  2,219,812
TRANSMISSION DRIVE
Original Filed April 8, 1938    4 Sheets-Sheet 3

INVENTOR
*Paul E. Hochstetter*
BY *Chapin + Neal*
ATTORNEYS

Oct. 29, 1940.　　　P. E. HOCHSTETTER　　　2,219,812
TRANSMISSION DRIVE
Original Filed April 8, 1938　　4 Sheets-Sheet 4
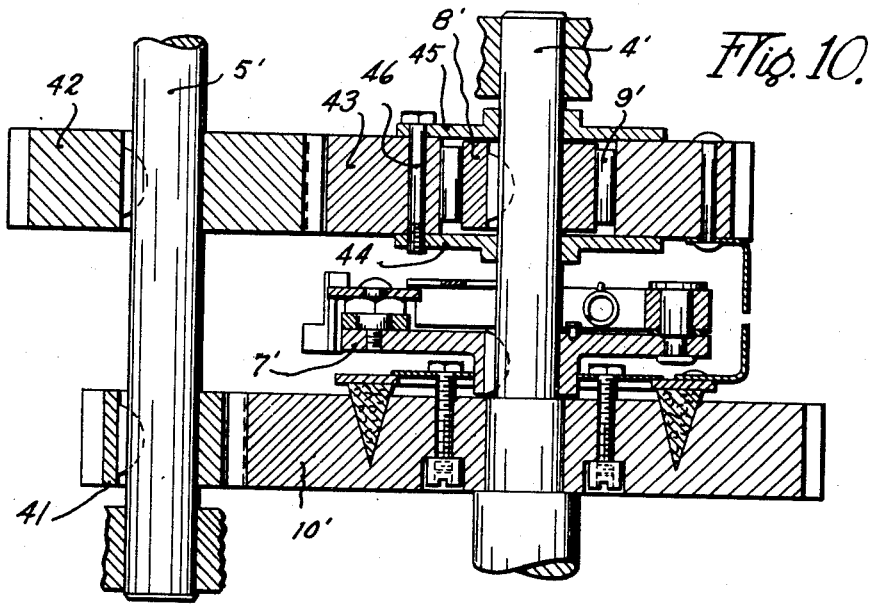
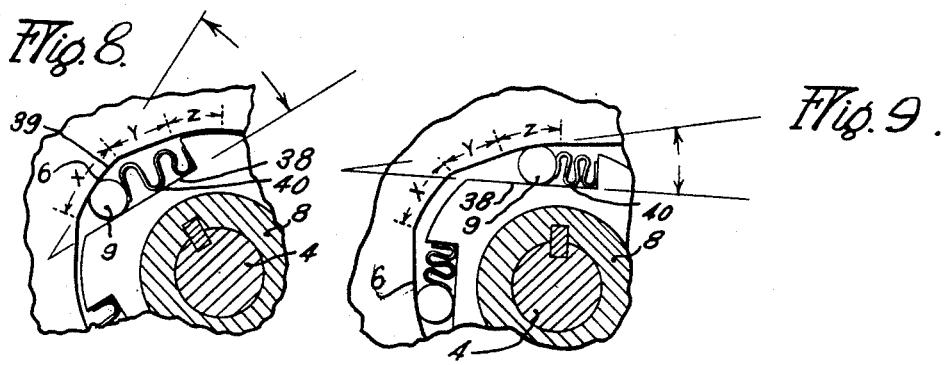
INVENTOR
PAUL E. HOCHSTETTER
BY
Chapin + Neal
ATTORNEYS Patented Oct. 29, 1940

2,219,812

UNITED STATES PATENT OFFICE 2,219,812

TRANSMISSION DRIVE

Paul E. Hochstetter, Toledo, Ohio

Application April 8, 1938, Serial No. 200,969
Renewed June 5, 1940

7 Claims. (Cl. 74—336)

This invention relates to a change speed drive mechanism between a prime mover operating at a relatively wide range of speeds and an element to be driven at a diminished range of varying speeds. My invention aims at the production of a more simple, compact and efficient structure which will be more reliable and durable in operation than the construction heretofore known.

My transmission in general comprises separately acting drive mechanisms, one transmitting at relatively higher ratio than the other, together with clutch appurtenances for shifting from one drive to the other under the control of a centrifugal governor. An important feature of my improvement resides in the arrangement of parts of reasonable size to effect the shift from one drive to the other with positiveness and certainty as distinguished from hesitancy and uncertainty. In carrying out this object of the invention I preferably employ devices in the nature of a relay comprising an easily moved pilot device actuated by the governor which in turn instigates the operation of means under the power of the drive itself which serve to bring about the necessary clutch action.

To the end of accomplishing the foregoing object and other improved results as will hereinafter appear, my invention consists in the novel combination and arrangement of parts as hereafter described in connection with the preferred embodiment of the same as shown in the accompanying drawings.

Referring to the drawings, which show a preferred embodiment of my invention, Fig. 1 is a longitudinal sectional view of the transmission drive, taken along line 1—1 of Fig. 3;

Fig. 2 is a detail top view of parts looking in direction of arrows 2—2 of Fig. 1;
Fig. 3 is a transverse sectional view of the transmission drive along line 3—3 of Fig. 1 in the direction of the arrows. It will be understood that in this view the strikers 20, 21 are in a different position than as illustrated in Fig. 1.
Figs. 4, 5, 6 and 7 are further similar views showing the parts in different stages of operation;

Figs. 8 and 9 are detail fragmentary views of the coacting elements of the overrunning clutch;
Fig. 10 is a modified form of transmission drive shown in section similar to Fig. 1.

Referring to Fig. 1, which shows the details of the transmission drive, the driving shaft is indicated at 4 and the driven shaft at 5. It will be understood that shaft 4 is operated from a prime mover which normally operates through a relatively wide range of speeds and that it is desired to have shaft 5 operate within a more narrow range of speed variation. The shafts 4 and 5 are in end to end alignment, and upon an inner reduced end of shaft 4 is a carrier member 7 fixed by its sleeve portion 8 firmly to the end of shaft 4. A small gear 6 is fixed to the end of the driven shaft 5 and this gear 6 is formed with a cup-shaped recess to receive therein an extended and slightly enlarged portion of the carrier sleeve 8. There is arranged between the enlarged end of said carrier sleeve 8 and the recess portion of gear 6 an overrunning or free wheel clutch of any usual suitable type, the rollers of which are indicated at 9. The driving engagement of the clutch is in a right hand or clockwise direction, looking along shaft 4 from left to right. From this it will be understood that when the gear 6 and its shaft 5 rotate faster than shaft 4 in a clockwise direction, the clutch part of gear 6 will freely overrun the clutch part of sleeve 8, and that when gear 6 slows down to the speed of shaft 4 the clutch members engage through the rollers 9 to drive shaft 5 directly with shaft 4.

A relatively large gear 10 is loosely mounted for free rotation on the end of shaft 4 at the left of the sleeve 8 and said gear 10 meshes with a smaller gear 11, the latter being fixed to a counter-shaft or rotatable counter-sleeve 12 upon a supporting shaft 13. Also fixed to the rotatable counter-sleeve 12 is a larger gear 14 which meshes with the previously referred to small gear 6, said gears 10, 11, 14 and 16 constituting what may be termed a high ratio transmission between the shafts 4 and 5. A constant friction drive member 15 is carried by the gear 10 and comprises an annular base ring with a friction portion 15' wedge-shaped in cross section as shown, which is received in and frictionally engaged with an annular V-socket 16 formed in one face of said gear 10. A series of bolts 17 are provided together with an annular disk 18 to adjustably and resiliently retain the drive member 15 in frictional engagement with its gear 10. The function of this friction drive member 15 is to relieve the shock of clutching engagement between gear 10 and shaft 4 as will be hereinafter described. The drive member 15 has formed integrally therewith a clutch lug 19, and said drive member 15 also has fixed thereto at a point on its circumference spaced at suitable distance from the lug 19 a striker 20. A similar striker 21 is fixed as shown to the small gear 6. These strikers constitute part of the power actuated means for engaging and disengaging the clutch between shaft 4 and the high ratio transmission as will be hereinafter described. Each of the strikers 20 and 21 is preferably formed as an angle piece with a horizontal finger portion preferably at the same radial distance from the axis of shaft 4, but slightly spaced from one another along said axis so as to have paths of rotation in different vertical planes. It will be observed that striker 20 since it is carried by gear 10 of the gear train will have a relative movement rotatively to the striker 21 which is carried on the gear 6 of said gear train, and the purpose of this will later appear.

Upon the carrier member 7 is mounted a centrifugal governor comprising a governor weight 22 pivoted at 23 on said carrier 7 and having a spring 24 normally tending to pull said weight radially inward. A nose 25 on said weight 22 acts as an inner stop therefor against the sleeve 8, and a lug 26 fixed to the rim of the carrier member 7 acts as the outer stop for said weight 22. Projecting from the outer end of the weight member 22 is a governor arm 27 having a notch 28 therein as shown in Fig. 3. A pilot 29 is pivoted for limited oscillatable movement on a stud 30 fixed to the carrier member 7. The lower pointed end of said pilot 29 carries a pin 31 which lies within the notch 28 of the governor arm 27 and is adapted to be operated by the sides of said notch in a manner and for a purpose to be described. A spring 32 is mounted on said carrier plate 7 and is arranged to bear against the pin 31 of the pilot 29 so as to yieldingly hold said pilot into either of its two (beyond dead center) positions into which it may be thrown. The upper rounding side of the pilot 29 carries integral therewith a catch member 33 having two upwardly projecting prongs 34, 35 which are spaced apart circumferentially and also offset axially from one another. The pilot 29 with its catch member 33 and prongs 34 and 35 constitute a preferable form of pilot device. One prong 34 is in the same vertical plane with the horizontal finger of the striker 20 and the other prong 35 is in the same vertical plane with the horizontal finger of the striker 21. The pilot 29 may be in position so that neither of the prongs 34 or 35 will be in the path of the strikers 20 or 21 and said pilot may also be moved so that one or the other of said prongs 34 or 35 will be in position to be engaged by its respective striker 20 or 21. Also mounted on the stud 30 closely adjacent to the pilot 29 is a clutch pawl 36 having a notch 37 within which is received the catch member 33. The clutch pawl 36 and clutch lug 19 constitute the interlocking members of a positive clutch between carrier 7 on shaft 4 and drive member 15 on gear 10 which is the clutch for connecting in the high ratio transmission. The movement of the catch member 33 within the notch 37 determines the position of said clutch pawl 36 for having engagement with or being disengaged from the clutch lug 19.

The operation of my transmission drive will now be described. The arrangement functions in general so that during the operation of the driving shaft 4 in the higher part of its speed range said driving shaft 4 will be directly coupled to the driven shaft 5 for giving it a one to one ratio of drive. When said shaft 4 slows down to the lower part of its speed range the governor acts to shift the transmission from the direct drive over to the gear train drive, which then operates the driven shaft 5 much faster than the driving shaft 4 and in effect keeps the driven shaft rotating in the same high speed range as if the driving shaft had not dropped down into its low speed range.

The functional operation above described is accomplished as follows: In Fig. 3 the parts are shown in position for operation through the gear train, the clutch pawl 36 being in engagement with clutch lug 19 whereby the carrier member 7 on the end of shaft 4 drives the gear 10 of said gear train, and shaft 5 of course is rotating faster than shaft 4 with the clutch at 9 overrunning. The striker 21 carried on gear 6 is also rotating faster than shaft 4 and relatively thereto in the direction of the arrow as indicated adjacent said striker 21. This means that striker 21 is moving relatively to the faster than the catch member 33 carried with shaft 4, but in the condition shown, striker 21 does not engage the prong 35 because the latter is down out of position.

In this condition of the parts, if shaft 4 increases its speed beyond a certain point, the governor weight 22 will move outwardly and through the notched arm 27 engaging pin 31, will rock the pilot 29 to the position shown in Fig. 4. The prong 35 will thus be raised into the path of the relatively moving striker 21 which upon striking the same will throw the pilot and catch 33 into its counter-clockwise position shown in Fig. 5. The relay pilot 29 in so moving will in the latter part of its said movement carry with it pawl 36 by reason of the catch 33 working in the notch 37 of said pawl 36 and in this way the pawl 36 will be disengaged from the lug 19. Thereupon gear 10 will no longer be driven by shaft 4 and the gear 6 of the gear train will gradually slow down with its shaft 5 until it is picked up by the clutch rolls 9 of shaft 4 for direct drive thereby. When this happens the striker 21 will travel synchronously with shaft 4, but the striker 20 will be rotating slower than shaft 4 due to the fact that gear 6 is now the driver of the gear train and gear 10 to which member 20 is fixed is in low ratio with respect to gear 6. In other words, relatively to shaft 4 the striker 20 is rotating clockwise as we look at Fig. 5 and this fact is intended to be indicated by the direction of the arrow adjacent striker 20 in said figure. In this condition, however, the striker 20 will not engage with the prong 34 because the latter is down out of position.

In Fig. 5 the driving shaft 4 is supposed to be rotating in the high part of its speed range and fast enough to keep the governor weight 22 in its outer position. As soon as the driving shaft 4 again slows down beyond a certain point the governor weight 22 will be drawn inwardly by its spring 24 and through its notched arm 27 will shift the pilot 29 into the position shown in Fig. 6. This action will raise prong 34 into the path of said relatively moving striker 20 for being engaged thereby and for throwing the pilot to its clockwise position shown in Fig. 7. This clockwise movement of the pilot 29 will through its engagement with notch 37, raise the end of pawl 36 into position for engaging the clutch lug 19 which is also moving relative to pawl 36, whereby the shaft 4 will again be clutched to drive gear 10 and the gear train for speeding up the driven shaft 5 relative to the driving shaft 4. The parts will then be in the position shown in Fig. 3.

Figure 6:
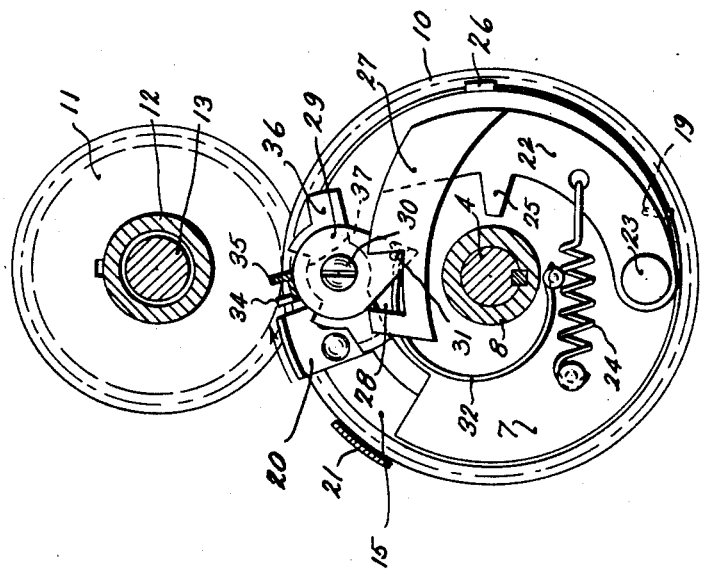

It will be noted that after running through the gear train drive as shown in Fig. 3 a subsequent shift to the direct drive between shafts 4 and 5 as shown in Fig. 5 will result in the faster rotating striker 21 gradually slowing down to synchronous speed with shaft 4. Unless prevented, the striker 21 might possibly finish its slowing down movement relative to shaft 4 in a position directly above the prong 35 at the moment that the overrunning clutch at 9 coupled the two shafts 4 and 5 together for the direct drive. If this should occur a subsequent shift back to the gear train drive would be blocked because the relay pilot 29 could not then be operated to raise prong 34 into the path of its striker 20 as shown in Fig. 6. In order to prevent such an occurrence, the interlocking portions of the overrunning clutch at 9 may be easily designed so that said clutch cannot lock shaft 4 to shaft 5 at the particular portion of the 360° of relative rotative angularity between said shafts in which striker 21 lies above the catch 33.

Figs. 8 and 9 show a suitable form for the coacting portions of an overrunning clutch to accomplish this purpose. The inner driving element of the clutch is indicated at 8 and the outer driven element at 6. The pockets for the rollers 9 of which only that for one quarter section is shown completely, comprise the inner chord surfaces 38 of the driver 8 and the outer broken curved surface 39 of the driven element 6. The spring for the roll 9 is indicated at 40. Each quarter segment of the outer surface 39 corresponding to one of the rolls 9 is formed into different zones of angularity with respect to the chord surface 38. One zone indicated at $x$ may be termed the slipping zone. Its angularity with respect to the chord 38 is so large that the roll 9 will not bite or lock between said surface $x$ and chord 38. A second zone at $z$ is the locking zone. Its angularity with respect to chord 38 is small enough so that the roll 39 will bite and lock the two surfaces together when caught therebetween. The third zone at $y$ is a transition surface between $x$ and $z$.

In Fig. 8 the previously overrunning driven element 6 of the clutch has dropped into synchronous speed with the driving element 8 at the point where the roll 9 engages the slipping surface $x$ whereas Fig. 9 shows the driven element 6 in the position where it has slipped back with respect to the driving element 8 until the roll 9 has engaged between the locking surfaces $z$ and chord 38. With such a construction of overrunning clutch it is only necessary that the coinciding positions of striker 21 and catch 33 be made to correspond with one of the coinciding positions of the slipping surface $x$ and its chord 38 as shown in Fig. 8. In this manner the striker 21 will be prevented from coming to a relative stopping position directly above the catch 33.

In some cases it may be desirable in my transmission drive to operate the driven shaft from a driving shaft in parallelism therewith instead of in direct end to end alignment therewith as in Fig. 1. Such a modified arrangement is shown in Fig. 10 wherein the driving shaft is indicated at 4' and the driven shaft. In this case the driving shaft 4' is a continuous integral member between its end bearings. The carrier member 7' is fixed to the shaft 4' and carries thereon the governor and related clutch parts as previously described, for engagement and disengagement with the gear 10' loosely mounted on said shaft 4'. The gear 10' meshes with the smaller gear 41 fixed to the end of the driven shaft 5' for driving the same at a relatively high speed ratio. A gear 42 is also fixed to shaft 5' for meshing with gear 43 which may be of equal size with gear 42. The gear 43 is mounted through an overrunning clutch, of a design similar to that already described, upon clutch collar 8' fixedly keyed to shaft 4', the rolls therefor being indicated at 9'. Side flanges 44 and 45 are fastened to gear 43 by bolts 46 for retaining the same in alignment on its clutch. In this arrangement the speed ratio drive through the overrunning clutch at 9' may be at one to one ratio or at different ratio if desired by changing the relative size of gears 42 and 43.

It will be understood that various changes in details of construction and equivalent arrangements of parts may be made without departing from the scope of the invention as herein claimed.

I claim:

1. A transmission drive between a variable speed prime mover and an element to be driven with a diminished range of speed variation, comprising in combination, a driving shaft, a driven shaft, a driving connection between said shafts for relatively low ratio drive, a transmission between said shafts for relatively high ratio drive, a clutch for connecting in said high ratio transmission, power actuated means for engaging and disengaging said clutch, a pilot device for instigating the operation of said power actuated means, and a centrifugal governor for controlling the operation of said pilot device.

2. A transmission drive between a variable speed prime mover and an element to be driven with a diminished range of speed variation, comprising in combination, a driving shaft, a driven shaft, an overrunning clutch for directly connecting said shafts, a transmission between said shafts for a relatively high ratio drive, a clutch for connecting in said high ratio transmission, power actuated means for engaging and disengaging said later named clutch, a pilot device for instigating the operation of said power actuated means, and a centrifugal governor for controlling the operation of said pilot device.

3. A transmission drive between a variable speed prime mover and an element to be driven with a diminished range of speed variation, comprising in combination, a driving shaft, a driven shaft, a driving connection between said shafts for a relatively low ratio drive, a transmission between said shafts for a relatively high ratio drive, a clutch for connecting in said high ratio transmission, power actuated means for engaging and disengaging said clutch, a pilot device movable into two different positions, one position for instigating said power actuated means to engage said clutch, and the other position for instigating said power actuated means to disengage said clutch, and a centrifugal governor operatively connected to one of said shafts for rotation therewith arranged to move said pilot device into one or the other of its positions depending upon the rotative speed of said governor.

4. A transmission drive between a variable speed prime mover and an element to be driven with a diminished range of speed variation, comprising in combination, a driving shaft, a driven shaft, a driving connection between said shafts for a relatively low ratio drive, a transmission between said shafts for a relatively high ratio drive, a clutch for connecting in said high ratio transmission, power actuated means for engaging and disengaging said clutch, said clutch comprising interlocking members and having associated therewith frictionally engaged members pressed together under constant load for easing the shock of engagement between said interlocking members, a pilot device for instigating the operation of said power actuated means, and a centrifugal governor for controlling the operation of said pilot device.

5. A transmission drive between a variable speed prime mover and an element to be driven with a diminished range of speed variation, comprising in combination, a driving shaft, a driven shaft, a driving connection between said shafts for a relatively low ratio drive, a transmission between said shafts for a relatively high ratio drive, a clutch for connecting in said high ratio transmission, a centrifugal governor operatively connected to one of said shafts for rotation therewith and a pilot device operable from said governor and rotatively carried therewith, power actuated means for effecting engagement and disengagement of said clutch under the control of said governor and pilot device, said power actuated means comprising strikers carried on different rotative parts of said transmission drive for rotation at different speeds relative to one another and whereby one of said strikers rotates faster than said pilot device during the action of the high ratio drive, and the other striker rotates slower than said pilot device during the action of the low ratio drive, and means whereby said governor by moving said pilot device into the path of one or the other of said strikers effects engagement or disengagement of said clutch, depending upon the rotative speed of said governor.

6. A transmission drive between a variable speed prime mover and an element to be driven with a diminished range of speed variation, comprising in combination, a driving shaft, a driven shaft, a driving connection between said shafts for a relatively low ratio drive, a transmission between said shafts for a relatively high ratio drive, a clutch for connecting in said high ratio transmission, a centrifugal governor operatively connected to one of said shafts for rotation therewith and a pilot device operable from said governor and rotatively carried therewith, said pilot device adapted to have a movement over a dead center into either one of two positions, power actuated means for effecting engagement and disengagement of said clutch under the control of said governor and pilot device, said power actuated means comprising strikers carried on different rotative parts of said transmission drive for rotation at different speeds relative to one another and whereby, one of said strikers rotates faster than said pilot device during the action of the high ratio drive, and the other striker rotates slower than said pilot device during the action of the low ratio drive, and means whereby said governor by moving said pilot device into the path of one or the other of said strikers effects engagement or disengagement of said clutch, depending upon the rotative speed of the governor.

7. A transmission drive between a variable speed prime mover and an element to be driven with a diminished range of speed variation, comprising in combination, a driving shaft, a driven shaft, a driving connection between said shafts for a relatively low ratio drive comprising an overrunning clutch, a transmission between said shafts for a relatively high ratio drive, a clutch for connecting in said high ratio transmission, a centrifugal governor operatively connected to one of said shafts for rotation therewith and a pilot device operable from said governor and rotatively carried therewith, power actuated means for effecting engagement and disengagement of said later named clutch under the control of said governor and pilot device, said power actuated means comprising strikers carried on different rotative parts of said transmission drive for rotation at different speeds relative to one another and whereby one of said strikers rotates faster than said pilot device during the action of the high ratio drive, and synchronously with said pilot device during the action of the low ratio drive, and the other striker rotates slower than said pilot device during the action of the low ratio drive, and synchronously with said pilot device during the action of the high ratio drive, said overrunning clutch comprising means to prevent its clutching action taking place when the first of the above named strikers is rotating in adjacent position to said pilot device, and means whereby said governor by moving said pilot device into the path of one or the other of said strikers effects engagement or disengagement of said clutch, depending upon the rotative speed of said governor.

PAUL E. HOCHSTETTER.